Nov. 14, 1967  LE ROY DILGER  3,353,124
NICKEL OXIDE CAPACITORS
Filed April 18, 1963  2 Sheets-Sheet 1
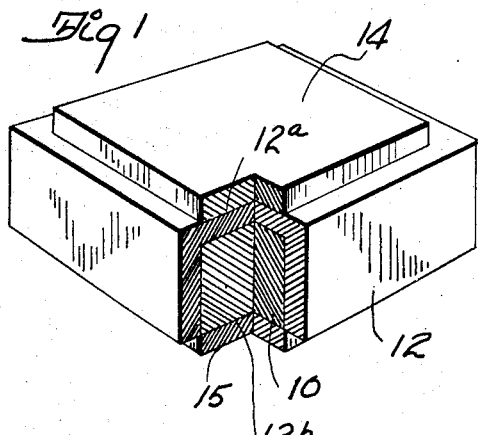
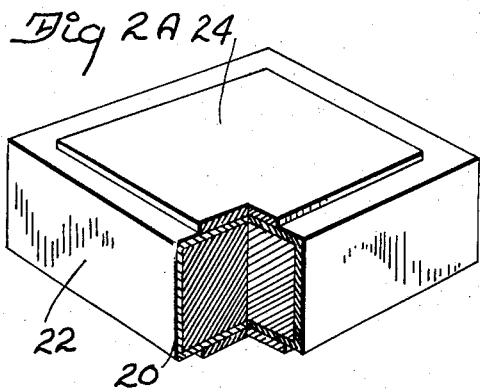
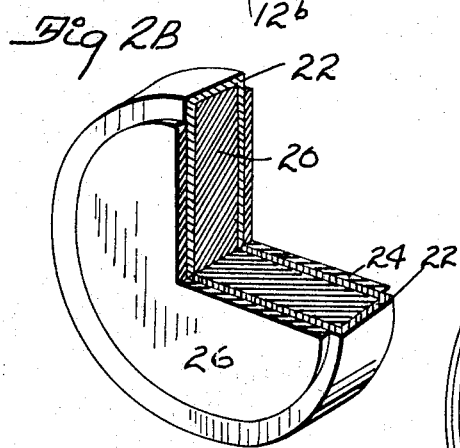
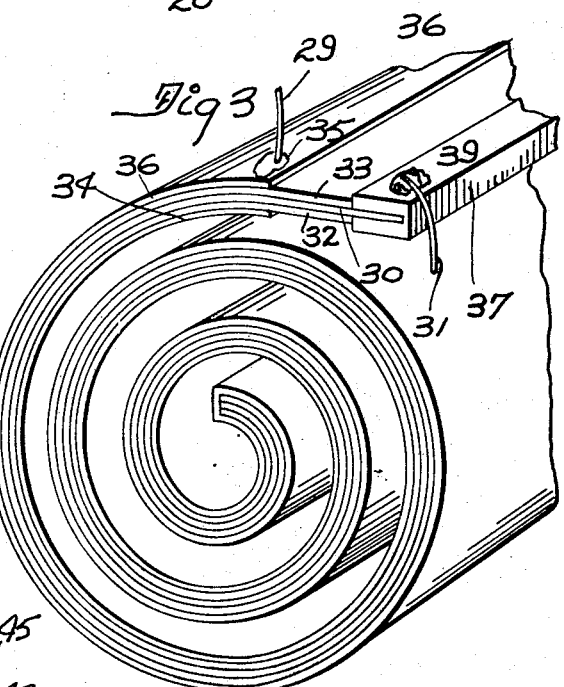
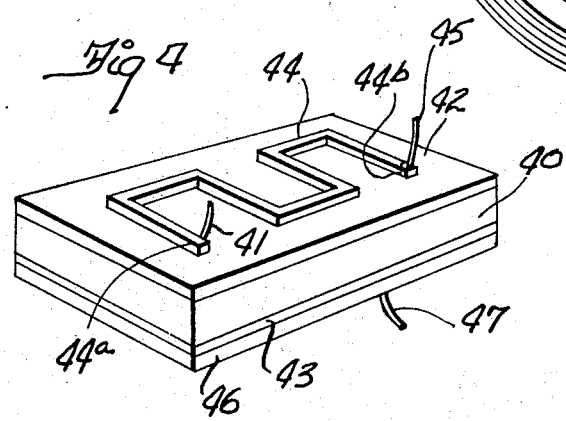
Inventor
Leroy Dilger
Pendleton, Neuman
Seibold, & Williams
atty.s'

Nov. 14, 1967
LE ROY DILGER
3,353,124
NICKEL OXIDE CAPACITORS
Filed April 18, 1963
2 Sheets-Sheet 2
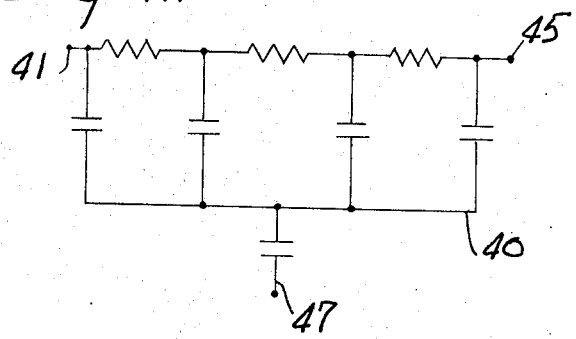
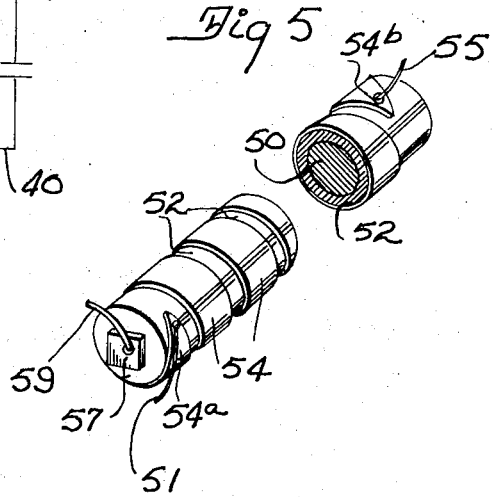
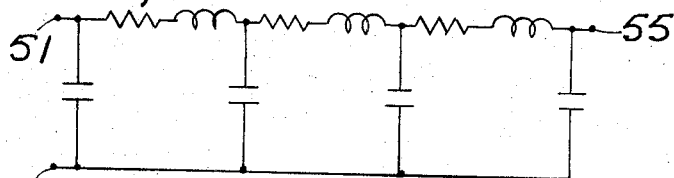
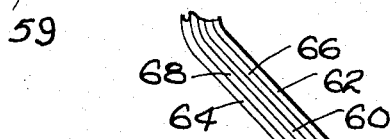
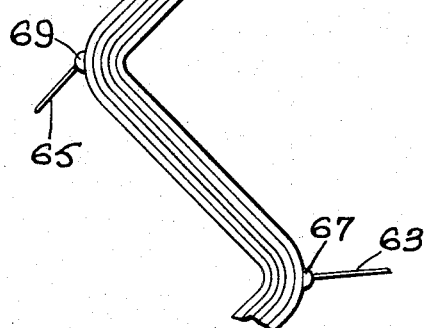
Inventor
Leroy Dilger
Pendleton, Neuman,
Seibold & Williams
atty's.

United States Patent Office 3,353,124
Patented Nov. 14, 1967

3,353,124
NICKEL OXIDE CAPACITORS
Le Roy Dilger, Milwaukee, Wis., assignor to Globe-Union Inc., Milwaukee, Wis., a corporation of Delaware
Filed Apr. 18, 1963, Ser. No. 274,043
22 Claims. (Cl. 333—76)

This invention relates to solid or dry type nonpolarized capacitors and particularly to capacitors utilizing nickel oxide as a dielectric material, and further relates to methods of manufacturing nickel oxide dielectric capacitors.

In the prior art, capacitors are known which employ an oxide of a metal as a dielectric, such metals being aluminum, titanium, tantalum, and the like. These oxides are generally extremely brittle and difficult to work, and capacitors using such oxides as dielectrics are, therefore, relatively difficult to manufacture and high in cost. In addition, the rates of growth of the metallic oxide layers of prior art capacitors have not been easily predictable, necessitating a costly selection process in order to produce capacitors of optimum tolerance. Also, these oxides are fragile and subject to fracture, which fracture results in short circuit of the capacitor, higher power factor, or loss of substantially all of the capacitance of a given unit.

Moreover, in prior art metallic oxide capacitors, it has been difficult to attach the terminals of the capacitor to opposite sides of the dielectric layer. An additional disadvantage of prior art capacitors is their tendency to change their characteristics with age and with exposure to heat.

By the present invention, an improved capacitor is provided which employs a layer of nickel oxide established directly on a nickel surface, which capacitor in large measure overcomes all of the above listed disadvantages of prior art capacitors. The nickel oxide of the present capacitor forms a thin homogeneous dielectric layer which results in a superior capacitor having a lower power factor. The dielectric is substantially nonpolarized, even when in a relatively moist atmosphere. The nickel oxide layer has a predictable rate of growth which enables formation of capacitors having capacitances closely approximating that which is expected, based on the rate of growth of the nickel oxide. It is therefore possible to manufacture capacitors having close tolerances without the necessity of a tedious selection process common in the prior art. Moreover, the characteristics of the capacitor do not change as the capacitor ages. The nickel oxide also has very suitable mechanical properties in that it does not flake off the surface of the nickel as readily as do the oxides of some other metals. Thus, the thickness of the nickel oxide layer, once established, is constant.

A further advantage accrues in the use of this material in that an oxygen permeable conductive paint can be applied to a nickel sheet, rod, or other form. The painted substrate may then be heated to fix the paint in place (during which period some oxidation of the nickel takes place beneath the paint), after which it can be cut or formed into the desired shapes. By a subsequent firing the nickel oxide film may then be completely developed beneath the layer of paint by oxygen diffusion therethrough, to yield the desired level of capacitance. This sequence of operations overcomes a serious disadvantage in the prior art procedure whereby the individual devices are first cut to size and then painted with conductive paint, since frequently during drying of the paint a short is created by flow of the paint around the edge of the capacitor and into contact with the opposite plate.

Processing of the capacitors in the manner just described (involving the double firing cycle) is preferred where cutting or otherwise forming the nickel substrate must take place under the conductive paint in order to produce the size or shape required in the final device. In cases, however, where such cutting or forming operations do not shear through nor grossly distort any portion of the substrate opposite the conductive paint, the subsequent firing cycle is not required. Therefore, complete firing to maturity of the dielectric film can be achieved by extension of the initial firing period, with the attendant advantages of the simplification of the manufacturing operations.

Capacitors having a nickel oxide dielectric manufactured in accordance with the processes of the present invention are very versatile in size and shape due to the nature of those processes and the superior ductility of nickel, and may be easily formed and/or deformed into any desired configuration. Moreover, nickel oxide capacitors may, according to the present invention, be manufactured in the form of large sheets of nickel which may be cut up into many smaller sizes and shapes after the deposition of a layer of oxygen-permeable conductive paint, to yield capacitors of a high degree of predictability as to capacitance range, in high yield, and with exceptional resistance to mechanical shock.

In capacitors constructed according to the present invention, terminals are easily attached to electrodes on opposite sides of the dielectric layer.

Accordingly, a principal object of the present invention is to provide capacitors using nickel oxide as a dielectric material and to provide processes for manufacturing such capacitors mechanically and with a high degree of precision.

It is another object of the present invention to provide a method of manufacturing capacitors utilizing nickel oxide as a dielectric layer by which terminals are easily attached to electrodes on opposite sides of the nickel oxide layer.

A further object of the present invention is to provide a capacitor, utilizing nickel oxide as a dielectric material, which capacitor has the characteristic of maintaining its electrical properties indefinitely without any substantial deterioration of such characteristics.

Other and further objects and advantages of the present invention will become clear upon examination of the accompanying specification, claims and drawings.

In one embodiment of the present invention, there is provided a method of manufacturing a nickel oxide capacitor comprising the steps of coating opposed surfaces of a nickel sheet with a conductive layer, at least one of the opposed surfaces being coated with an oxygen-permeable conductive layer, setting the coating, heating the sheet to cause formation of a layer of oxide, principally NiO, on the surface of the sheet under the oxygen-permeable paint, forming the sheet to a desired shape, and reheating the sheet for a predetermined time to thicken said NiO layer to form a capacitor of a predetermined capacitance, having the two coated surfaces as terminals.

In another embodiment of the present invention, there is provided a capacitor comprising a sandwich having successive layers of silver, nickel oxide, nickel, nickel oxide, and silver, the silver layers adapted to form the terminals for the capacitor.

For more complete understanding of the present invention, reference will now be made to the accompanying drawings in which:

FIG. 1 is a perspective view, partly in section, of a first embodiment of a capacitor embodying the present invention;

FIGS. 2A and 2B are perspective views, partly in section, of different forms of another embodiment of the present invention;

FIG. 3 is a perspective view of still another embodiment of the present invention;

FIG. 4 is a perspective view of an alternate embodiment of the present invention;

FIG. 4A is a schematic circuit diagram of the equivalent electrical circuit of the embodiment of FIG. 4;

FIG. 5 is a perspective view of a further embodiment of the present invention;

FIG. 5A is a schematic diagram of the equivalent circuit of the embodiment of FIG. 5; and FIG. 6 is a diagrammatic cross-sectional view of another embodiment of the present invention during formation.

Throughout the drawings no attempt has been made to maintain the various parts to a particular scale. In particular, the oxide layers are quite thin and are generally exaggerated considerably in the illustrations.

In the practice of the process embodying the present invention, the surface of a nickel sheet is cleaned and polished to provide a clean smooth surface, free of nicks, scratches and inclusions. Acetone is preferably used as a cleaning agent, and a reasonably fine finish is required although a high polish on the surface is not necessary. The surface is then painted with an oxygen-permeable conductive paint, the paint being applied to the surface evenly by either brushing or a silk screening process.

The paint is dried at approximately 300° to 500° F. until the volatile solvents in the paint are driven off. The painted nickel sheet is then fired at about 1600° F. in air for about ten minutes, to fuse the conductive paint and to produce a coating of NiO over the surface of the nickel underneath the layer of conductive paint. NiO has a very high resistance, and a dielectric constant of about 5–7. The conductive surface forms one electrode, with the nickel sheet comprising the other.

The nickel sheet is then cooled in air, and, when cool, may be formed and shaped by shearing, punching, bending, and the like, until the entire nickel sheet or a portion thereof is in the desired form for the finished capacitor. After forming the sheet is reheated to about 1600° F. in air for a period of 20 to 60 minutes, depending upon the service requirements for the capacitor.

A first terminal may be soldered directly to the conductive paint overlying the nickel oxide layer, while a second is in ohmic contact with the nickel sheet. This latter connection may be made by grinding away the nickel oxide surrounding the other surface of the nickel sheet and soldering a terminal directly to the nickel.

Preferable, however, the ohmic contact of the capacitor is made with the nickel member prior to the firing of the nickel at 1600° F. by welding, brazing, or the like, or, by a painting process which will not be described.

In order to attain an ohmic connection directly with the nickel plate, one side of the nickel member is painted with an oxygen-permeable paint and a noncontiguous side is painted with a conductive paint that is not oxygen-permeable. When the nickel member is fired, NiO does not form under the nonpermeable paint, and the conductive paint remains in ohmic contact with the nickel sheet. After firing, a terminal may be attached to the paint, by soldering for example.

The preferred oxygen-premeable conductive paint comprises approximately 70% silver in particle form of about 250 mesh, 6% $BiO_3$, and the remainder volatile solvents having a sufficiently low boiling point to be quickly driven off at a temperature of 300°–500° F. The particles are generally spherical in shape (as opposed to being in flake form), by which is meant that their dimensions in all directions are approximately the same.

The preferred conductive paint which is not oxygen-permeable comprises approximately 62% silver particles and 2% lead borosilicate as a frit, with the remainder being volatile solvents. The silver particles are preferably in the form of flakes, having one dimension substantially less than any transverse direction. Alternatively, instead of lead borosilicate, any other active flux which limits the oxidation to a very slow rate, substantially preventing oxidation, may be substituted to prevent the formation of NiO under the nonpermeable paint.

The bismuth trioxide is a frit, and when it is included as an ingredient in the oxygen-permeable paint oxidation proceeds more rapidly than without it, although the reasons for this are not fully understood. The oxygen that forms the NiO under the surface of the oxygen-permeable paint evidently comes from the air atmosphere in the furnace in which the nickel sheet is fired. Thus, when a nickel sheet is fired in a nitrogen atmosphere, NiO does not form, even though bismuth trioxide is included in the conductive paint. Conversely, NiO forms only very slowly under the surface of the paint when the bismuth trioxide is omitted. One possible explanation is that the frit has a catalytic effect on the oxidation reaction. When the painted sheet is first fired at 1600° F., the frit in the paint fuses, and the silver particles become evenly distributed in the frit.

In addition to the particular frit employed with the paint, the shape of the silver particles also affects the speed of growth of the NiO layer. One possible explanation for this is that the symmertical particles leave relatively large spaces between them, through which oxygen may flow, while the flake form of particles overlie each other to effectively prevent oxygen flow.

Since oxygen in the heated atmosphere is necessary to oxidize the nickel, it is preferable that the gases in the atmosphere within the furnace be circulated or agitated to insure the availability of a constant supply of oxygen to take part in the process of oxidizing the nickel.

The initial heating of the nickel plate at the relatively low temperature of 300° to 500° F. is for the purpose of driving off the volatile solvents in which the silver and frit of the conductive paint is suspended. As the solvents evaporate, the silver particles and frit are loosely held together in a fine even layer or film. Upon heating to about 1600° for a short interval, as already described, the silver particles appear to form a continuous phase, such that each of the silver particles are in contact with each other, while the frit fuses and also forms a continuous phase, extending around the silver particles. Upon cooling, the entire mass becomes bonded to the nickel substrate. After the formation of the oxide under the silver, and under the frit, the silver phase comprises a good electrical conductor, insulated from the nickel by the NiO layer.

The temperature at which the nickel plate is fired is approximately 1600° F., as it has been found that this temperature range results in the formation of the purest NiO when the nickel is oxidized. A permissible range of plus or minus 50° F. is acceptable. If the temperature is not within the range of 1550° to 1650° F., one of the other two oxides of nickel, namely, $Ni_2O_3$ or $Ni_3O_4$ and particularly the black oxide will be formed, which do not have sufficiently high insulating properties to produce high quality capacitors. The formation of any of the three oxides of nickel may be determined by visual inspection of the oxide layer, since each of the three oxides has a different characteristic color. The desired NiO is green, while the $Ni_2O_3$ is black, and $Ni_3O_4$, a very unstable form, is yellow. In any event, the maximum temperature should not exceed 1770° F. which is the melting point of the silver within the conductive paint. If this temperature is exceeded, the particulate integrity of the silver coat is destroyed, preventing proper oxidation and interfering with the formation of a homogeneous oxide film.

The time of the first firing at the elevated temperature of 1600° F. is short (about 10 minutes) and is for the purpose of forming a thin layer of NiO under the silver coating, and fusing the frit, thereby to bond the silver particles in the coating to the nickel oxide layer. The nickel oxide may be subjected to only a moderate bending stress or strain. Damage to the oxide layer therefore may occur during the forming of the capacitor into the desired shape. However, discontinuities in the structure of the nickel oxide layer are eliminated and appear to be cured or "healed" during the second firing cycle. The minimum time for the additional firing cycle is about 20 minutes which results in a capacitor having a moderately rugged physical strength characteristic. When the total firing time at the elevated temperature (including first and second firings) is about 30 minutes, the capacitance between the silver coating and the nickel plate is approximately 25,000 pf. per square inch, with a breakdown voltage of about 25 volts. Increased firing times build up a thicker layer of nickel oxide between the silver and the nickel, thereby increasing the breakdown voltage and reducing the capacitance per unit area. When the total firing of the nickel plate is about 60 minutes, the breakdown voltage is about 100 volts, and the capacitance is about 15,000 pf. per square inch. The increased firing times also render the capacitor more durable and the oxide layer less subject to cracking in response to stresses which may be applied to the capacitor during use.

For some purposes, the second firing (or refiring) step of the process is not necessary, and only a single firing produces the completed capacitor. This is the case where the capacitor is preformed to its final shape before the firing step, and also where the forming of the capacitor (if undertaken after the firing step) does not damage the oxide layer.

The power factor of the capacitors produced by the process of the present invention depends primarily on the method employed for connecting the terminal leads, and in the preferred method, by which silver leads are fused to the frit, is less than 1.0% at one kilocycle, and becomes very much less at higher frequencies in the limit approaching the power factor of a mica capacitor. The temperature coefficient of the capacitance is positive, and very low being on the order of approximately .02% per degree C. The temperature coefficient is linear, and corresponds generally to the thermal expansion of the nickel substrate. In addition, the NiO layer is nonpolarized, and, as a result, the utility of the capacitor is not limited by the necessity of maintaining the electrical charge across the dielectric in a single direction, as in electrolytic capacitors.

It has been noted above that the atmosphere of the furnace in which the nickel plate is fired must include an appreciable oxygen content. It is also important that the atmosphere be clean, since foreign particles such as, for example, flakes from the electrodes of an electric furnace, decrease the quality of the capacitor and may produce noncurable shorts if they are permitted to come into contact with the oxygen-permeable paint during firing. Hence, it is desirable to surround the nickel sheet during firing with a nickel screen, for the purpose of preventing any relatively large particles of foreign matter from coming in contact with the silver surface.

Capacitors may be made by the above process from an extremely thin sheet of nickel provided only that the sheet is self-sustaining, a thickness of .002 to .005 inch being satisfactory. Of course, thicker sheets or plates of nickel may also be used. Also sheets formed of other materials may be employed if a sufficient nickel film is provided on at least one surface thereof.

If desired, when carrying out the process of the present invention, nonpermeable paint may be applied first and, thereafter, dried and fired before the application of the oxygen-permeable paint. This permits the nickel oxide layer to be built up on the surface of the nickel before the application of the oxygen-permeable paint. In this event, it is not as essential that the coating of conductive paint be applied evenly to the surface of the sheet, since the major portion of the nickel oxide layer is built up during the firing, after applying the nonpermeable paint. Therefore, the permeable paint is applied, dried, and fired at approximately 1600° F. for about 10 minutes, which is sufficient to fuse the frit and effect a good bond between the nickel oxide and the conductive paint, and to cure any short circuits which may develop by leakage of the conductive paint into the interstices in the crystal-like structure of the nickel oxide. The quality of the capacitors resulting from this process is as good as that attained when the two different paints are both applied before the first firing at 1600° F.

Terminal leads may be attached to the silver coatings of the capacitor, and preferably are so attached by placing a silver conductor in contact with the conductive paint during firing. It is preferable that the conductor be composed of a material easily wetted by the molten frit so that a firm bond is effected upon cooling. When two opposite surfaces of a nickel sheet are to be provided with terminal leads, a U-shaped or hairpin-shaped conductor is employed, having an end in contact with each surface which is to have a terminal lead. After firing, the U-shaped conductor is cut in two, thereby providing a separate terminal lead for each surface. The terminal leads may be solid silver or gold, or may be of any other metal with a silver or gold coating. If brass is employed, it must be precoated with a metal, such as silver, which is wetted by the molten frit during firing. When a second firing step is performed, the leads are fused during the second firing.

FIG. 1 illustrates a capacitor which has been constructed in accordance with the above process, in which one major surface 12a of a nickel sheet 10 is coated with a layer 14 of oxygen-permeable conductive paint, while another major surface 12b is coated with a layer 15 of conductive paint which is not oxygen-permeable. An oxide layer 12 forms under the paint 14, while the paint 15 remains directly in contact with the nickel sheet 10.

In FIGS. 2A and 2B there are shown capacitors of similar construction, in square and circular form, respectively. In FIGS. 2A and 2B, however, the nickel oxide layer 22 completely surrounds the nickel plate 20, and the conductive surfaces 24 and 26, formed with oxygen-permeable paint, each overlie the nickel oxide layer 12 on both opposite sides of the nickel plate 10. This results in a pair of series-connected capacitors, since two layers of the nickel oxide film 12 are contained between the conductive plates 14 and 16. It will be obvious that such a series capacitor has approximately one-half of the capacitance and twice the breakdown voltage of the capacitor illustrated in FIG. 1.

It has been noted above that the nickel oxide layer formed on the surface of the nickel during firing has limited flexibility and may form discontinuities when subjected to more than a moderate strain. Accordingly, it has been found impractical to attempt to fire a relatively large, evenly coated, sheet of nickel to maturity and then cut up smaller sections of the large sheet to form individual capacitors. When this is attempted, discontinuities form in the NiO layer causing short circuits through the capacitor. A conductive pattern may, however, be silk screened onto the nickel and fired to maturity, after which the sheet may be cut into smaller pieces by severing it along lines which are free of a conductive coating.

It is practical, however, to fire a large sheet at the elevated temperature for a short time, and then cut up the large sheet into smaller sections, after which they may be refired to cure and heal faults in the nickel oxide layer. Refiring is not necessary, however, where a pattern of oxygen-permeable conductive paint is silk screened onto the nickel surface before firing, and the sheet is cut along lines where no conductive paint is deposited. The smaller sections may be of any size and shape, and may resemble the units illustrated in FIGS. 2A and 2B, for example. When many smaller capacitors are made from a large sheet in this way, manufacture is simplified, and there is no danger of short circuits occurring by the conductive paint running over the edge of the sheet to the opposite surface during the drying step, during which the conductive paint is extremely fluid, because the edges are trimmed, eliminating any short circuits which exist.

The smaller sections into which the larger sheet is cut may be in the form of disks or plates, or alternatively may be in the form of strips which may be rolled up to form a roll-type capacitor having a relatively high capacitance. Such a capacitor is shown in FIG. 3. As illustrated in FIG. 3, the capacitor comprises a nickel sheet 30 coated on both sides with a layer of nickel oxide 32 and 33, the oxide layer being overlain with conductive surfaces 34 and 36. When rolled tightly in the form of a roll, as illustrated in FIG. 3, the conductive layer 34 is in contact with the conductive layer 36. These two electrically common conductive layers form one terminal of the capacitor while a section 37 of conductive coating is applied to a portion of the nickel sheet 30 directly without any intervening nickel oxide layer 32. This is preferably accomplished by painting a portion of the sheet with a layer 37 of conductive paint which is not oxygen-permeable, as disclosed above. Leads 29 and 31 are connected to the layers 36 and 37, respectively, by solder connections 35 and 39. It is apparent that the roll in FIG. 3 actually comprises two capacitors in parallel, each including one of the nickel oxide layers 32 and 33. The capacitance of the structure of FIG. 3, therefore, has twice the capacitance per unit area of the sheet as it would with a single film and the same breakdown voltage.

Referring now to FIG. 4, there is illustrated an RC network comprising a resistor, of the printed circuit type, printed on the surface of nickel sheet 40 in the form of an elongated strip 44. The strip 44 is printed with an oxygen-permeable conductive paint and permits the formation of a nickel oxide layer 42 between the strip 44 and the nickel sheet 40, upon firing. A second layer 46 of oxygen-permeable conductive paint is disposed upon the opposite side of the nickel sheet 40, to permit the formation of a second nickel oxide layer 43, upon firing. The sheet is then fired. It is apparent that the resistance of the strip 44 between its two ends 44a and 44b depends upon the length of the strip 44, its thickness, and the resistivity of the material with which it is composed. Noble metal paints using gold or platinum are preferred, as they have a relatively high resistivity, and yet readily permit oxide formation. A capacitance also exists between each increment of the strip 44 and the nickel sheet 40. Terminals 41, 45 and 47 are soldered or fused to the ends 44a and 44b of the strip 44, and to the surface 46, respectively. The second nickel oxide layer 43 forms a dielectric in a second capacitor, the electrodes of which are the nickel sheet 40 and the conductive surface 46, such as to form the distributed resistance-capacitance circuit illustrated in FIG. 4A. It will be appreciated that such a circuit comprises a low pass filter, when connected as a T-section with the terminals 41 and 45 comprising input and output terminals, and the terminal 47 comprising the common terminal. The ratio of resistance to capacitance is easily controlled by controlling the width and thickness of the strip 44. A wider, thinner, strip 44 (while retaining the same cross-sectional area) produces a unit having the same resistance, but a higher distributed capacitance. It is evident that a terminal may also be connected directly to the nickel sheet 40, if desired, in the same manner as in FIG. 3.

The strip 44 may alternatively be painted onto the surface of the oxide after firing. This is preferable when the paint is designed to be dried or fired at a lower temperature than 1600° F. such as carbon base paints which are preferably dried at about 300–385° F. By this process paints may be used which are not oxygen-permeable.

Referring now to FIG. 5, there is illustrated an RLC network embodying the present invention in which a nickel rod 50 is coated with a helical strip 54 of oxygen-permeable conductive paint and fired producing a layer of nickel oxide 52 over the entire rod 50 and notably between the nickel rod 50 and the conductive surface of the strip 54. Another conductive portion 57 has conductive paint which is not oxygen-permeable applied to the nickel rod 50, such as to form an electrode which is electrically connected to the nickel rod 50. Terminals 51, 55 and 59 are soldered to the ends 54a and 54b of the strip 54, and the electrode 57, respectively. The resulting circuit is illustrated in FIG. 5A, which has a series resistance and inductance between the terminals 51 and 55, with distributed capacitance between the resistance and inductance and the common terminal 59. The structure of FIG. 5, therefore, comprises an RLC network which may conveniently be used as a low pass filter or as a delay line by making the nickel rod 50 the common terminal and connecting opposite ends 54a and 54b of the silver strip 54 as the input and output terminals of the filter. The resistance of the circuit is controlled by adjusting the proportion of silver in the conductive paint, and the thickness with which the paint is applied. The inductance is controlled by the number of turns the strip 54 winds about the rod 50.

The RLC circuit of FIG. 5 may be made in a variety of ways. In one method, the strip 54 is painted upon the surface of the nickel rod 50 in a helical fashion as illustrated and then dried and fired.
(48)

Alternatively, the strip 54 is painted on the surface of the rod 50 in a direction parallel to the axis of the rod 50, dried and fired for a short time. Thereafter, the rod 50 is twisted to cause the straight line painted on the rod to conform to a helix, and the unit is fired again to maturity.

In still another method, the outer surface of the nickel rod 50 is given a uniform coating of conductive paint, and after the paint is dried and fired for a short period to bond it to the nickel, a helical groove extending below the surface of the conductive coating is cut into the surface of the rod, and the unit is fired to maturity.

Referring now to FIG. 6, there is illustrated another embodiment of a capacitor constructed in accordance with the process just described, comprising a nickel sheet 60, which is overlain on each side with a layer of oxygen-permeable conductive paint 62 and 64 thereby to permit formation of dielectric layers 66 and 68 between the nickel sheet 60 and each of the layers of the oxygen-permeable conductive paint 62 and 64. The layers 62 and 64 of conductive paint are preferably formed by dipping the nickel sheet 60 into the paint to apply evenly to both surfaces of the sheet 60 a uniform layer of conductive paint. The painted nickel sheet 60 is then exposed for a short time to a temperature of approximately 1600° F., thereby to form thin layers 66 and 68 of nickel oxide between the nickel sheet 60 and the opposing conductive surfaces 62 and 64. The sheet 60 is then formed into a capacitor by folding such sheet back and forth on itself. FIG. 6 illustrates the capacitor in cross section during an intermediate phase of the folding, a final product being such that the capacitor is pressed flat with opposing portions of the conductive coating 64 in contact with each other, and with opposing portions of conductive layer 62 in contact with each other. It will be noted that nowhere does the conductive layer 62 contact the conductive layer 64, as in the cylindrical embodiment illustrated in FIG. 3. A pair of terminals 63 and 65 are connected by soldering or the like at 67 and 69, to the conductive surfaces 62 and 64 to form the finished capacitor. Alternatively, a terminal may be connected to the nickel sheet 60 itself by coating an end portion thereof with a conductive paint which is not oxygen-permeable, as has been described above with reference to FIG. 3. When a terminal is connected directly to the nickel sheet 60, the conductive surfaces of 62 and 64 may be electrically connected together in parallel to double the capacitance.

If, however, terminals are attached only to the layers 62 and 64 (as shown), the breakdown voltage of the capacitor is doubled, since two layers 66 and 68 of nickel oxide are interposed between the conductive surfaces 62 and 64.

In the formation of the capacitor illustrated in FIG. 6, it is preferable to trim the edges of the sheet 60 during the formation of the capacitor, so that there is no possible short circuit between the conductive layers 62 and 64 around the edge of the sheet 60. After formation of the desired shape, the capacitor of FIG. 6 is again subjected to a temperature of approximately 1600° F. to cure the capacitor and to permit the oxide film to build up to a thickness corresponding to the desired capacitance and breakdown voltage.

In the above description of the present invention, a sheet has been particularly referred to. It should be evident, however, that the present invention may be employed with nickel bars, slabs, rods, wires, or the like, as long as a reasonably fine surface is provided for oxidation.

Although the above invention has been particularly described with reference to nickel per se, certain alloys of nickel have also been found to be suitable in the practice of the present invention. Thus a nickel alloy having approximately 99% nickel, ½ of 1% of silicon, and the remainder trace metals may be satisfactorily used, and produces capacitors having power factors of less than 1.0%. Nichrome, composed of about 80% nickel and 20% chromium, has also produced satisfactory capacitors, but with a power factor of about 7%. On the other hand, an alloy of 93% nickel and 7% manganese produces capacitors having undesirable power factors. Large power factors are also produced by using stainless steel, having about 8% nickel. It therefore appears that the alloy must be substantially pure nickel in order to yield low power factors. The impurities are preferably held to less than .04%.

It has been noted above that the nickel oxide layer forming a part of capacitors produced in accordance with the present invention is subject to damage from excess strain. Accordingly, the preferred method of connecting terminals or leads to the electrodes of the capacitor is by the fusing process already described by which the entire capacitor is heated to about 1600° F., and then is allowed to cool while the conductive surfaces are each in contact with a silver conductor. The frit, upon freezing, forms a rigid connection between each conductive surface and its conductor. The two conductors then form "pigtail" terminals for the capacitor.

Without further elaboration, the foregoing will so fully and completely describe the present invention as to enable those skilled in the art to make and use the same. It will be evident, however, that certain minor changes and modifications may be made in the embodiments described and illustrated without departing from the essential items of novelty involved, which items are intended to be defined and secured by the following claims.

What is claimed is:

1. A method for manufacturing a capacitor comprising painting two noncontiguous surfaces of a nickel member with conductive paint containing conductive particles formed of a noble metal, frit and a solvent, the paint applied to one of said surfaces being oxygen-permeable, drying said paint by removing said solvent, and firing said nickel member in an atmosphere containing oxygen for a period of time and at a temperature such that said frit flows freely, said conductive particles maintain their integrity, and a thin continuous homogeneous layer of NiO having a green color is formed on the surfaces of said nickel plate exposed to said oxygen to form an intermediately disposed dielectric film.

2. The method according to claim 1, wherein said oxygen-permeable paint comprises a major amount of silver particles of approximately 250 mesh, and a minor amount of bismuth trioxide dispersed in a vehicle of volatile solvents, said bismuth trioxide fusing during said firing step.

3. The method according to claim 1, wherein said drying step is performed by heating said nickel member to a temperature slightly in excess of the boiling point of said solvent, and said firing step is performed by heating said nickel member to a temperature between about 1550° F. and about 1650° F.

4. The method according to claim 1, wherein said firing step is performed by heating said nickel member to approximately 1600° F.

5. The method according to claim 1, wherein said firing step extends for at least 30 minutes.

6. A method of manufacturing capacitors having uniform capacitances per unit area comprising painting one side of a substantially pure nickel sheet with an oxygen-permeable paint including frit and conducting particles formed of a noble metal, drying said paint, firing said sheet at an elevated temperature to form a layer of NiO between said paint and said nickel sheet and to fuse said frit, forming said sheet into a predetermined shape, and refiring said sheet after said forming to increase said oxide layer and to heal any discontinuities in said layer resulting from said forming.

7. The method according to claim 6, wherein said firing step extends for approximately 10 minutes, and said refiring step extends for at least 20 minutes.

8. The method according to claim 6, including the step of trimming the edges of said sheet before said refiring step.

9. The method according to claim 6, including the step of painting another portion of said sheet with a conductive paint which is not oxygen-permeable, whereby said firing bonds said conductive paint to said sheet thereby to form an electrode of a capacitor.

10. The method according to claim 6, including the steps of painting the reverse side of said sheet with oxygen-permeable conductive paint, and rolling up said sheet into a spiral during said forming step.

11. The method according to claim 10, including the step of attaching a first conductor to one of said painted surfaces, and attaching a second conductor to said nickel sheet to form terminals for said capacitor.

12. The method according to claim 6, including the steps of painting the reverse side of said sheet with oxygen-permeable conductive paint, and folding said sheet into serpentine arrangement during said forming step.

13. A method for manufacturing a capacitor comprising painting a member having a nickel surface with conductive paint containing conductive particles formed of a noble metal, frit and a solvent, said paint being permeable to oxygen to permit said nickel surface to oxidize when heated in the presence of oxygen, drying said paint by removing said solvent, and firing said member in an atmosphere containing oxygen for a period of time and at a temperature such that said frit flows freely, said conductive particles maintain their integrity, and a continuous and homogeneous layer of NiO having a green color is formed on said nickel surface beneath said conductive paint where said nickel surface is exposed to oxygen to form an intermediately disposed dielectric film.

14. A method of making an RC network comprising painting a resistive pattern with a conductive oxygen-permeable paint upon the surface of a nickel sheet, drying said paint, and firing said sheet at an elevated temperature to form NiO under the surface of said paint between said paint and said nickel, whereby there is produced a circuit having a predetermined resistance between the terminals of said resistive pattern, and a predetermined distributed capacitance between said resistive pattern and said nickel sheet.

15. A method of making an LC network comprising painting a helical pattern about a nickel rod with oxygen-permeable conductive paint, drying said paint, and firing said rod at an elevated temperature in an atmosphere containing oxygen to form NiO on the surfaces of said rod exposed to oxygen, whereby a predetermined inductance exists between the ends of said helical pattern, and a predetermined distributive capacitance exists between said helical pattern and said rod.

16. A capacitor comprising a nickel member having two noncontiguous surfaces, one of said surfaces having a covering of nickel oxide, said covering having a fused coating of frit containing flake-like particles of silver, the other of said surfaces having a fused coating of frit containing particles of silver having substantially equal diameters in all directions, and means for attaching terminals to said coatings.

17. A capacitor according to claim 16, wherein a terminal lead is fused to each of said coatings.

18. A capacitor comprising a nickel member, one surface of said nickel member being covered with a layer of NiO bonded to said nickel member, said layer being overlain with a fused coating of bismuth trioxide containing particles of silver having substantially equal diameters in every direction, said silver particles comprising a continuous phase throughout said bismuth trioxide, a second noncontiguous surface of said nickel member being covered with a fused coating of lead borosilicate containing particles of silver having one dimension substantially less than its dimensions transverse to said one dimension.

19. A capacitor comprising an elongated nickel sheet, said sheet having disposed on two opposed surfaces thereof a coating of NiO and a coating of conductive material overlying each of said NiO coatings, said sheet being folded in serpentine relationship, and a pair of conductors, each of said conductors being electrically connected to a different one of said surfaces.

20. A capacitor comprising a sheet of nickel, said sheet being wrapped in the form of a spiral and having a coating of nickel oxide substantially in the form NiO on both surfaces of said sheet, said coating of nickel oxide having an adherent coating of conductive material receptive to soldering on both surfaces of said sheet, said coatings of conductive material being disposed adjacent each other within said spiral, terminal members, and means connecting one of terminal members to one of said conductive surfaces and another of said terminal members to said nickel sheet.

21. An RC network comprising a nickel sheet, said sheet having a coating of NiO on one surface thereof, an elongated layer of a material having a predetermined conductivity overlying said coating of NiO, a plurality of terminals, means for connecting one of said terminals to each end of said strip and means for connecting a third terminal to said nickel sheet, whereby said strip comprises a resistance between said first pair of terminals, and a predetermined distributed capacitance exists between said strip and said third terminal.

22. An LC network comprising a nickel rod, a coating of NiO disposed over the entire surface of said rod, a helically disposed elongated strip of conductive material overlying said coating of NiO, a pair of terminals, means for connecting the ends of said strip to said pair of terminals, a third terminal, and means for connecting said rod to said third terminal, whereby a predetermined inductance is formed between said first and second terminals and a predetermined distributed capacitance is formed between said strip and said third terminal.

References Cited

UNITED STATES PATENTS

| | | | |
|---|---|---|---|
| 2,036,425 | 4/1936 | Majoral | 148—6 |
| 2,299,228 | 10/1942 | Gray | 317—258 |
| 2,317,114 | 4/1943 | Rosenberg | 148—6 |
| 2,506,130 | 5/1950 | Bain | 317—261 |
| 2,566,666 | 9/1951 | Khouri | 317—256 |
| 2,677,794 | 5/1954 | Gutterman | 317—258 |
| 2,703,857 | 3/1955 | Englehardt | 317—261 |
| 2,899,345 | 8/1959 | Oshry | 217—260 X |
| 3,081,439 | 3/1963 | Bennett | 333—31 |
| 3,141,145 | 7/1964 | Barrett | 333—79 |

HERMAN KARL SAALBACH, *Primary Examiner.*

C. BARAFF, *Assistant Examiner.*

UNITED STATES PATENT OFFICE
CERTIFICATE OF CORRECTION

Patent No. 3,353,124　　　　　　　　　　　　　　November 14, 1967

Le Roy Dilger

It is hereby certified that error appears in the above numbered patent requiring correction and that the said Letters Patent should read as corrected below.

Column 3, line 52, for "not" read -- now --; column 8, line 22, strike out "48".

Signed and sealed this 26th day of November 1968.

(SEAL)
Attest:

Edward M. Fletcher, Jr.　　　　　　　　　　　　　EDWARD J. BRENNER
Attesting Officer　　　　　　　　　　　　　　　　Commissioner of Patents